United States Patent [19]

McGahee

[11] 3,870,343
[45] Mar. 11, 1975

[54] TRAILER HITCH AND SAFETY CONNECTOR
[75] Inventor: Welbourne D. McGahee, Melbourne, Fla.
[73] Assignee: Loop-A-Line, Inc., Melbourne, Fla.
[22] Filed: May 2, 1974
[21] Appl. No.: 466,344

[52] U.S. Cl. ............................................. 280/457
[51] Int. Cl. ............................................. B60d 1/12
[58] Field of Search .................................. 280/457

[56] References Cited
UNITED STATES PATENTS
2,937,885  5/1960  Skoki ................................. 280/457
2,998,982  9/1961  Brazil ................................. 280/457
3,265,407  8/1966  Paddock ............................ 280/457
3,325,187  6/1967  Noakes ........................... 280/457 X Primary Examiner—Leo Friaglia
Attorney, Agent, or Firm—Warren E. Ray

[57] ABSTRACT

A conventional trailer hitch for use between towing and towed vehicles provided with a special connector used with the usual safety chains. The special connector is cast integrally with the hitch tongue or is affixed to an existing tongue either directly or through an intermediate metal plate, and includes left and right horizontal ring portions cooperating with left and right S-shaped connector members.

9 Claims, 6 Drawing Figures

PATENTED MAR 11 1975  3,870,343

3,870,343

1

TRAILER HITCH AND SAFETY CONNECTOR

BRIEF SUMMARY OF THE INVENTION

This invention provides apparatus on a trailer hitch tongue whereby the usual safety chains from a towed vehicle may be quickly connected and disconnected to and from the hitch tongue with a minimum of difficulty and without the need for a special chain end link or hook. The horizontal ring portions and the vertical connector members made of deformable rather than brittle metal retain the chains connected even in a rollover in part due to gravity. There is no possibility that the safety chains will bounce out of position.

The primary object of the invention is the provision of apparatus whereby the safety chains of a towed vehicle may be easily and quickly attached and detached.

Another object is the provision of a special connector cast integrally with a trailer hitch tongue or affixed to the tongue directly or through a separate metal plate.

Still another object is the provision of a special connector made of deformable metal whereby the safety chains are retained in most cases despite an accidental separation of towing and towed vehicles.

The invention in the foregoing aspects and in other subsidiary or related aspects will be fully apprehended from the following detailed description of preferred embodiments taken in conjunction with the appended drawing, in which:

DETAILED DESCRIPTION

Figure 1:
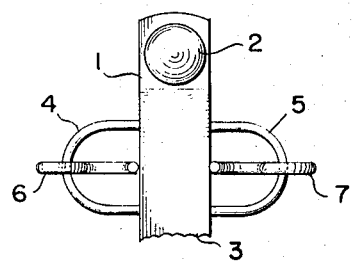
FIG. 1 is a top view of a conventional trailer hitch tongue integrally combined with the safety special connector apparatus.

This invention is directed to a special connector device for receiving the safety chains of any type of towed vehicles combined with the conventional trailer hitch in which applicant does not claim any novelty in a hitch per se. Turning now to the drawing FIG. 1 is a top view of a conventional trailer hitch tongue 1 having the usual ball joint 2. The end 3 adjacent the towing vehicle is foreshortened since the hitch per se is conventional. The left horizontal ring portion 4 and the right horizontal ring portion 5 are cast integrally with the tongue 1 as are cooperating left connector member 6 and right connector member 7. These horizontal ring portions and the vertical connector members are substantially the same in all of the figures. How the special connector cooperates with the usual safety chains and some minor modifications will be set forth below.

2

Figure 2:
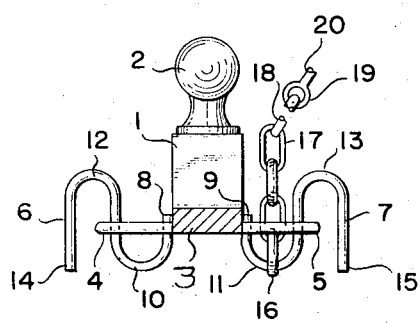
FIG. 2 is an end view of FIG. 1 showing one of the usual safety chains.

FIG. 2 is an end view of FIG. 1 showing one of the usual safety chains, it being understood that the second chain is omitted for simplicity of illustration. The tongue 1 with ball joint 2 and foreshortened end 3 is integrally connected to left horizontal ring portion 4 and right horizontal ring portion 5 as are left connecting member 6 and right connecting member 7 as in FIG. 1. At 8 and 9 the left connector member and the right connector member are integrally connected to the tongue 1. From front to rear the tongue in FIG. 2 (and in FIG. 3) has a rise but it will be understood that the tongue may be any conventional tongue with or without a rise. The left connector member 6 and the right connector member 7 include a left inner loop 10, a right inner lower loop 11, a left upper outer loop 12, a right upper outer loop 13, the latter two elements culminating in ends 14, 15. The chain is passed upwardly through the right horizontal ring portion 5, and chain end link 16 of the conventional safety chain is threaded over end 15 of the connector member 7. The safety chain will end up in the position shown in FIG. 2, and, of course, removal involves a reverse process. The chain link 17, as exemplary of several such links, is connected to an end link 18 which is connected to an eye 19 with shank 20 of a bolt connected to the towed vehicle as is conventional.

Figure 3:
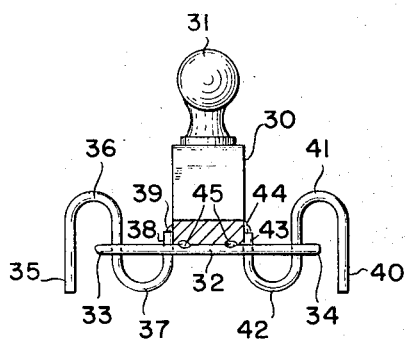
FIG. 3 shows an end view wherein the safety connector elements are welded to a trailer hitch tongue.

In FIG. 3 the elements of the safety connector are welded to a trailer hitch tongue 30 having the usual ball joint 31. The left horizontal ring portion 33 and the right horizontal ring portion 34 are joined with long horizontal connecting members 32 which are welded to the tongue body as at spot welds 45. The spots welds 45 are exemplary also of seam welds. The left vertical connecting member having an outer end 35, a left upper outer loop 36, and a left inner lower loop 37, is welded at the inner end 38 to the side of the tongue at weld 39. Similarly, the right vertical connecting member having an outer end 40, a right upper outer loop 41, and a right inner lower loop 42, is welded at the inner end 43 to the right side of the tongue at weld 44. The safety chains are connected in FIG. 3 and other figures as described with regard to FIG. 2. It will be noted that the elements of the safety connector have been affixed to an existing trailer hitch tongue.

Figure 4:
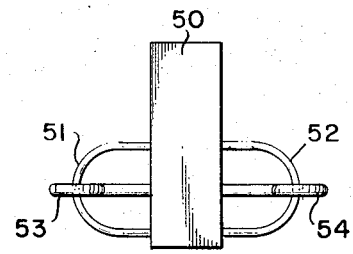
FIG. 4 depicts the safety connector in a top view similar to FIG. 1 intregally made with a separate metal plate that is affixed to an existing hitch tongue.

The modification in FIG. 4 illustrates the left horizontal ring portion 51, the right horizontal ring portion 52, the left connecting member 53, and the right connecting member 54 made integral with a metal plate 50. The metal plate 50 may be affixed to an existing trailer hitch tongue with bolts or by welding. The function of the safety connector is the same as hereinbefore described.

Figure 5:
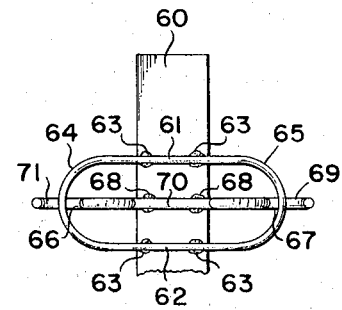
FIG. 5 illustrates the combination in a bottom view somewhat similar to FIG. 3 wherein the elongated horizontal ring and the connector member are welded to an existing hitch tongue or to a separate metal plate.

Another modification is depicted in FIG. 5 wherein the safety connector elements are welded to an existing hitch tongue or to a separate metal plate which may be welded to the conventional tongue. In this bottom view (somewhat similar to FIG. 3) the left horizontal ring portion 64 and the right horizontal ring portion 65 are joined by long horizontal connecting members 61, 62 to a trailer hitch tongue or a metal plate 60 to be affixed to a tongue by spot welds 63 which may be seam welds. The left vertical connector member 66 with end 71 and the right vertical connector member 67 with end 69 are joined by central connecting portion 70 which is connected to the tongue or metal plate 60 by means of spot or seam welds 68. As with other figures the safety connector elements function in the same manner.

Figure 6:
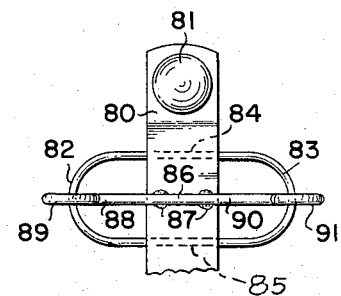
FIG. 6 is a top view of a hitch tongue wherein the elongated horizontal ring is welded to the bottom and the connector member is welded to the top of the tongue.

FIG. 6 is a top view of a hitch tongue or separate metal plate 80 wherein the elongated horizontal ring and the connector member are welded to an existing tongue or to a metal plate affixed to a tongue. The usual ball joint 81 is shown on tongue 80 which would be omitted on a separate metal plate. The left horizontal ring portion 82 and the right horizontal ring portion 83 are connected by long horizontal connecting members 84, 85 (shown in phantom) which are affixed to the bottom of the tongue as by welding. The left connector member 88 with end 89 and the right connector member 90 with end 91 are joined with central connecting portion 86. The central connecting portion 86 is joined to the top of the tongue or plate 80 by means of spot or seam welds 87 whereas the horizontal ring portions are affixed to the bottom of the tongue. It will be understood that this relationship could be reversed without losing the functions. The functions in all figures are identical with minor modifications of structure to obtain the same.

When the hitch comes off the ball joint 2 (referring to FIG. 2 as exemplary) as would occur during a failure the load would be on the right inner loop 11 causing that loop to bend or be deformed so as to close the space between loops 11 and 13 and the horizontal ring portion 5. Added resistance is obtained when loop 11 comes into contact with ring 5 to aid in holding the load since these elements are made of deformable metal rather than brittle metal. In this condition the end chain link cannot become disengaged, and would require a cutting torch for removal. While the safety connector is rendered useless thereafter, it will have served its intended purpose.

It will be apparent that the embodiments shown are only exemplary and that various modifications can be made in construction and arrangement within the scope of my invention as defined in the appended claims.

I claim:

1. A trailer hitch and safety connector comprising a hitch tongue means for a connection between a towing and towed vehicle, a left and right horizontal ring portions connected to said hitch tongue means, a left and right vertical connector members affixed to said hitch tongue means, said left and right vertical connector members each including an inner lower loop and an outer upper loop, said vertical connector members being located about midway of said ring portions and cooperating therewith, and safety chains connected to the towed vehicle and removably connected to said left and right vertical connector members.

2. A trailer hitch and safety connector according to claim 1 wherein said horizontal ring portions and said vertical connector members are integral with said hitch tongue means.

3. A trailer hitch and safety connector according to claim 1 wherein said horizontal ring portions and said vertical connector members are made of deformable metal.

4. A trailer hitch and safety connector according to claim 1 wherein said horizontal ring portions and said vertical connector members are welded to said hitch tongue means.

5. A trailer hitch and safety connector according to claim 1 wherein said hitch tongue means comprises a hitch tongue and a metal plate affixed thereto, said horizontal ring portions and said vertical connector members being integral with said metal plate.

6. A trailer hitch and safety connector according to claim 1 wherein said hitch tongue means comprises a hitch tongue and a metal plate affixed thereto, said horizontal ring portions and said vertical connector members being welded to the underside of said metal plate.

7. A trailer hitch and safety connector according to claim 1 wherein said horizontal ring portions are affixed to the bottom of said hitch tongue means, and said vertical connector members are affixed to the top of said hitch tongue means.

8. A trailer hitch and safety connector according to claim 1 wherein said safety chains include an end link normally connected to said inner lower loops of said vertical connector members.

9. A trailer hitch and safety connector according to claim 1 wherein said vertical connector members are S-shaped in configuration.

* * * * *